US009429226B2

United States Patent
Ike et al.

(10) Patent No.: US 9,429,226 B2
(45) Date of Patent: Aug. 30, 2016

(54) AUTOMATIC TRANSMISSION

(71) Applicant: AISIN AW CO., LTD., Anjo-shi, Aichi-ken (JP)

(72) Inventors: Nobukazu Ike, Anjo (JP); Takeshi Torii, Anjo (JP); Hiroaki Sanji, Anjo (JP); Tsubasa Deguchi, Anjo (JP)

(73) Assignee: AISIN AW CO., LTD., Aichi-ken (JP)

( * ) Notice: Subject to any disclaimer, the term of this patent is extended or adjusted under 35 U.S.C. 154(b) by 1 day.

(21) Appl. No.: 14/436,288

(22) PCT Filed: Nov. 19, 2013

(86) PCT No.: PCT/JP2013/081166
§ 371 (c)(1),
(2) Date: Apr. 16, 2015

(87) PCT Pub. No.: WO2014/077407
PCT Pub. Date: May 22, 2014

(65) Prior Publication Data
US 2015/0233466 A1 Aug. 20, 2015

(30) Foreign Application Priority Data

Nov. 19, 2012 (JP) ................................. 2012-253754

(51) Int. Cl.
*F16H 57/08* (2006.01)
*F16H 3/66* (2006.01)

(52) U.S. Cl.
CPC ............ *F16H 57/082* (2013.01); *F16H 3/663* (2013.01); *F16H 3/666* (2013.01); *F16H 2057/087* (2013.01); *F16H 2200/006* (2013.01); *F16H 2200/0086* (2013.01);

(Continued)

(58) Field of Classification Search
CPC ......................... F16H 57/082; F16H 2057/087
See application file for complete search history.

(56) References Cited

U.S. PATENT DOCUMENTS

| 6,422,971 | B1 | 7/2002 | Katou et al. | |
|---|---|---|---|---|
| 7,654,929 | B2 * | 2/2010 | Kimes | F16H 57/082 475/331 |
| 8,187,141 | B2 * | 5/2012 | Goleski | F16H 57/082 475/331 |

(Continued)

FOREIGN PATENT DOCUMENTS

| GB | 2446265 A | 8/2008 |
|---|---|---|
| JP | 10-169728 A | 6/1998 |

(Continued)

OTHER PUBLICATIONS

Communication dated Feb. 25, 2016 from the European Patent Office in counterpart application No. 13854298.0.

(Continued)

*Primary Examiner* — Sherry Estremsky
(74) *Attorney, Agent, or Firm* — Sughrue Mion, PLLC

(57) ABSTRACT

A carrier having short pinion gears and long pinion gears is made compact, and the mountability of the carrier on vehicles is improved. In a structure of the carrier, short pinion gear housing spaces are formed between thick-walled portions of a carrier body and a carrier cover, and long pinion gear housing spaces are formed between flange portions and the carrier cover. Bridge portions are provided on the radially outer side of the short pinion gear housing spaces, and fixed to the carrier cover. Openings are provided on the radially outer side of the long pinion gear housing spaces. Splines to be engaged with a friction member of a clutch are formed on the outer peripheral surfaces of the bridge portions.

5 Claims, 6 Drawing Sheets

(52) U.S. Cl.
CPC ........... *F16H 2200/2007* (2013.01); *F16H 2200/2023* (2013.01); *F16H 2200/2046* (2013.01); *F16H 2200/2082* (2013.01); *F16H 2200/2097* (2013.01)

(56) References Cited

U.S. PATENT DOCUMENTS

| 9,273,737 B2* | 3/2016 | Heuver ................ F16H 57/08 |
| 2005/0188520 A1 | 9/2005 | Simon |
| 2006/0089228 A1 | 4/2006 | Nakagawa et al. |

FOREIGN PATENT DOCUMENTS

| JP | 2001-108027 A | 4/2001 |
| JP | 2006-125425 A | 5/2006 |
| JP | 2008-89051 A | 4/2008 |
| JP | 2008-121808 A | 5/2008 |

OTHER PUBLICATIONS

International Search Report of PCT/JP2013/081166, dated Feb. 10, 2014. [PCT/ISA/210].

* cited by examiner

FIG. 2

|  | C-1 | C-2 | C-3 | C-4 | B-1 | B-2 | F-1 |
|---|---|---|---|---|---|---|---|
| 1ST | ○ |  |  |  |  | (○) | ○ |
| 2ND | ○ |  |  |  | ○ |  |  |
| 3RD | ○ |  | ○ |  |  |  |  |
| 4TH | ○ |  |  | ○ |  |  |  |
| 5TH | ○ | ○ |  |  |  |  |  |
| 6TH |  | ○ |  | ○ |  |  |  |
| 7TH |  | ○ | ○ |  |  |  |  |
| 8TH |  | ○ |  |  | ○ |  |  |
| Rev1 |  |  | ○ |  |  | ○ |  |
| Rev2 |  |  |  | ○ |  | ○ |  |

(○): WHEN ENGINE BRAKING IS IN OPERATION.

AUTOMATIC TRANSMISSION

CROSS REFERENCE TO RELATED APPLICATIONS

This application is a National Stage of International Application No. PCT/JP2013/081166 filed Nov. 19, 2013, claiming priority based on Japanese Patent Application No. 2012-253754, filed Nov. 19, 2012, the contents of all of which are incorporated herein by reference in their entirety.

TECHNICAL FIELD

The present subject matter relates to an automatic transmission to be mounted on an automobile, for example, and particularly to an automatic transmission including a carrier (hereinafter referred to as a Ravigneaux type carrier or simply as a carrier) having short pinion gears and long pinion gears.

BACKGROUND ART

Hitherto, there has been an automatic transmission including a Ravigneaux type planetary gear including a carrier having short pinion gears and long pinion gears, and a clutch provided at the outer periphery of the carrier (Patent Document 1). In the automatic transmission, eight forward speeds and two reverse speeds are established by a combination of the Ravigneaux type planetary gear and a double-pinion planetary gear. The Ravigneaux type carrier is composed of a carrier body and a carrier cover. The carrier cover has an extending portion that extends so as to cover the entire circumference including the radially outer side of the short pinion gears. The extending portion serves as a clutch hub with a clutch (C-2) disposed on the radially outer side thereof. In addition, a brake (B-2) and a one-way clutch (F-1) are provided side by side at the outer periphery of a drum portion of the carrier body.

RELATED-ART DOCUMENTS

Patent Documents

[Patent Document 1] Japanese Patent Application Publication No. 2008-121808 (JP 2008-121808 A)

SUMMARY OF THE INVENTION

If it is attempted to increase the torque capacity of the clutch disposed on the extending portion along with an increase in torque capacity required for the automatic transmission, it is necessary to enhance the torsional rigidity of the carrier (that is, the extending portion of the carrier cover). In the structure according to Patent Document 1, it is necessary to increase the wall thickness of the extending portion in order to enhance the torsional rigidity. In such a case, however, the outside diameter of the carrier (carrier cover) is increased, which hinders the automatic transmission from becoming compact in the radial direction. This may make it difficult to mount the automatic transmission on a vehicle.

In the automatic transmission according to Patent Document 1, in addition, the clutch on the extending portion of the carrier cover and the brake on the drum portion of the carrier body are disposed side by side in the axial direction, which increases the axial dimension of the automatic transmission.

Therefore, the present embodiment has been made to address the foregoing issues by improving the structure of a Ravigneaux type carrier, and has an object to provide an automatic transmission capable of enhancing the torsional rigidity of the carrier and suppressing an increase in size of the carrier in the radial direction.

Means for Solving the Problem

The present embodiment provides an automatic transmission including a carrier having short pinion gears and long pinion gears, and a friction engagement element disposed on an outer peripheral side of the carrier, wherein:
  a structure that supports the short pinion gears and the long pinion gears of the carrier includes a carrier body and a carrier cover;
  the carrier body includes an annular flange portion, thick-walled portions that are integral with the flange portion, and bridge portions that extend from the thick-walled portions, long pinion gear housing spaces are formed between the flange portion and the carrier cover, and short pinion gear housing spaces are formed between the thick-walled portions and the carrier cover;
  a radially outer side of the short pinion gear housing spaces is covered by the bridge portions which extend from the thick-walled portions and distal ends of which are integrally fixed to the carrier cover;
  a radially outer side of the long pinion gear housing spaces is made open by opening portions provided between the bridge portions in a circumferential direction; and
  splines to be engaged with a friction member of the friction engagement element are formed on outer peripheral surfaces of the bridge portions.

A ring-shaped annular member that extends over an entire circumference is integrally fixed to outer peripheral portions of the bridge portions on a side of the thick-walled portions.

The annular member includes a cylindrical portion provided on a radially outer side of the thick-walled portions to extend in parallel with outer peripheral surfaces of the thick-walled portions; and
  engagement element that is different from the friction engagement element is mounted to the cylindrical portion.

The annular member includes a hub member provided on a radially outer side of the friction engagement element to extend in parallel with outer peripheral surfaces of the bridge portions;
  the hub member is engaged with a friction member of a different friction engagement element that is different from the friction engagement element; and
  the friction engagement element and the different friction engagement element (B-2) are disposed so as to at least partially overlap each other in an axial direction as viewed in a radial direction.

The symbols in the above parentheses are provided for reference to the drawings, and should not be construed as affecting the scope of the claims in any way.

According to an embodiment, the structure of the carrier includes the carrier body in which the flange portion, the thick-walled portions, and the bridge portions are formed integrally, and the carrier cover fixed to the distal ends of the bridge portions. Thus, the torsional rigidity of the carrier can be enhanced compared to that according to the related art (such as that described in Patent Document 1). In addition, the openings are provided on the radially outer side of the long pinion gear housing spaces, and only the radially outer side of the short pinion gear housing spaces is covered by the bridge portions. Thus, the bridge portions which couple the carrier body and the carrier cover to each other can be disposed on the radially inner side compared to those according to the related art (such as those described in Patent Document 1). With a combination of such features, the friction engagement element having the friction member engaged with the splines formed on the outer peripheral surfaces of the bridge portions can also be formed on the radially inner side, which makes it possible to make the automatic transmission compact, in particular in dimension in the radial direction. In addition, lubricating oil supplied from the center shaft side is supplied from the openings to the friction engagement element.

According to another embodiment, the annular member is fixed on the outer peripheral portions of the bridge portions on the side of the thick-walled portions. Thus, the rigidity of the carrier body having the bridge portions alternated with the openings to extend in a comb teeth shape can be improved.

According to another embodiment, the annular member has the cylindrical portion on the side of the thick-walled portions, and the engagement element such as a one-way clutch is mounted to the cylindrical portion. This enables the engagement element to be positioned on the radially inner side of the cylindrical portion, and to be disposed at a position at which the engagement element overlaps a ring gear engaged with the long pinion gears in the axial direction as viewed in the radial direction and side by side with the friction engagement element in the axial direction, which makes it possible to make the automatic transmission compact.

According to another embodiment, the annular member has the hub member extending toward the bridge portions. This enables a so-called two-storied structure in which the different friction engagement element engaged with the hub member is disposed on the radially outer side of the friction engagement element. In combination of the reduction in diameter of the carrier, the automatic transmission can be made compact, and the mountability of the automatic transmission on vehicles can be improved. In addition, the different friction engagement element (a brake, for example) is disposed on the radially inner side, and the diameter of the different friction engagement element does not become excessively large, which prevents a reduction in transfer efficiency with drag torque limited in a predetermined range.

BRIEF DESCRIPTION OF THE DRAWINGS

FIG. 2 is an engagement table of the automatic transmission according to the embodiment.

FIG. 4 is a view of a carrier according to the embodiment as seen from the side of a sectional surface taken at the middle portion, in which

FIG. 5 is a view of a carrier according to the embodiment, which is cut at the middle portion, as seen from the side of a side surface, in which

DETAILED DESCRIPTION OF THE PREFERRED EMBODIMENTS

Figure 1:
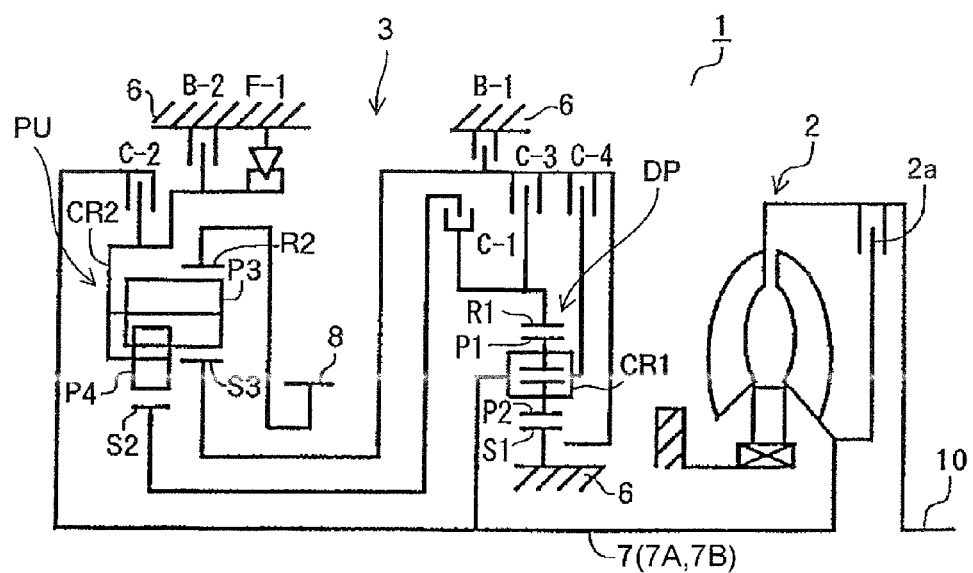
FIG. 1 is a skeleton diagram schematically illustrating an automatic transmission according to an embodiment.
Figure 1:
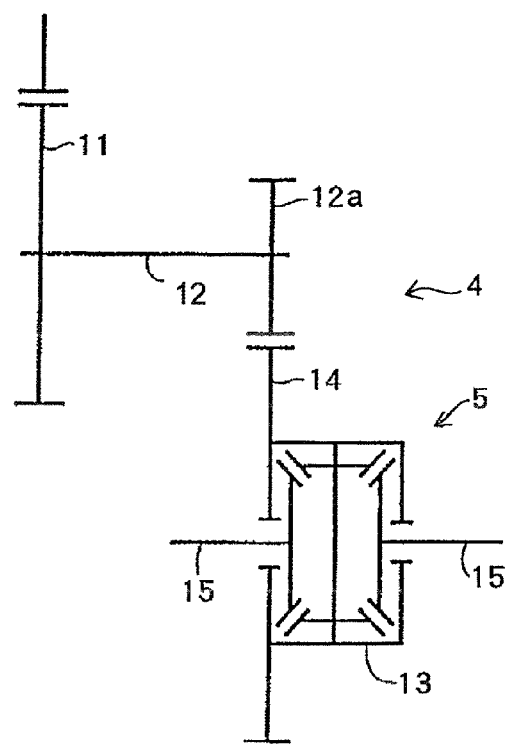

An embodiment will be described below with reference to FIGS. 1 to 3. An automatic transmission according to the present embodiment is an automatic transmission that is suitably mounted on FF (front-engine front-drive) vehicles, for example. The left-right direction in FIGS. 1 and 3 corresponds to the left-right direction (or the direction opposite to the left-right direction) with the automatic transmission actually mounted on a vehicle. For convenience of description, however, the right side of the drawings on which a drive source such as an engine is provided is referred to as "front side", and the left side of the drawings is referred to as "rear side".

First, a schematic configuration of an automatic transmission 1 to which the present embodiment may be applied will be described with reference to FIG. 1. As illustrated in FIG. 1, the automatic transmission 1, which is suitable for use in FF (front-engine front-drive) vehicles, for example, includes a torque converter 2 having a lock-up clutch 2a disposed on the front side, and a speed change mechanism 3, a counter shaft portion 4, and a differential portion 5 disposed on the rear side.

The torque converter 2 is disposed on an axis centered on an input shaft 7A of the speed change mechanism 3, which is coaxial with an output shaft 10 of an engine (not illustrated), for example. The speed change mechanism 3 is disposed on an axis centered on a center shaft 7B (see FIG. 3) connected coaxially with the input shaft 7A. The counter shaft portion 4 is disposed on a counter shaft 12 which is on an axis extending in parallel with the input shaft 7A and the center shaft 7B. The differential portion 5 is disposed in such a manner that left and right drive shafts 15, 15 are on an axis extending in parallel with the counter shaft 12.

In the skeleton diagram illustrated in FIG. 1, the automatic transmission 1 is illustrated as developed in plan. The input shaft 7A and the center shaft 7B, the counter shaft 12, and the left and right drive shafts 15, 15 are in a triangular positional relationship as viewed from a side.

The speed change mechanism 3 includes the input shaft 7A to which rotation from the engine is transferred via the torque converter 2, and the center shaft 7B disposed to be connected to the rear side of the input shaft 7A. That is, in the automatic transmission 1, the input shaft 7A and the center shaft 7B constitute an input shaft 7 in a broad sense. The speed change mechanism 3 also includes a planetary gear DP provided on the input shaft 7A, and a planetary gear unit (planetary gear set) PU provided on the center shaft 7B.

The planetary gear DP is a so-called double-pinion planetary gear, which includes a first sun gear S1, a first carrier CR1, and a first ring gear R1 and in which the first carrier CR1 has pinions P2 meshed with the first sun gear S1 and pinions P1 meshed with the first ring gear R1 in such a manner that the pinions P2 and the pinions P1 are meshed with each other.

Meanwhile, the planetary gear unit PU is a so-called Ravigneaux type planetary gear, which includes four rotary elements, namely a second sun gear S2, a third sun gear S3, a second carrier CR2, and a second ring gear R2 and in which the second carrier CR2 has long pinion gears P3 meshed with the third sun gear S3 and the second ring gear R2 and short pinion gears P4 meshed with the second sun gear S2 in such a manner that the long pinion gears P3 and the short pinion gears P4 are meshed with each other.

The first sun gear S1 of the planetary gear DP is stationary in terms of rotation with respect to a case 6. In addition, the first carrier CR1 is connected to the input shaft 7A so as to be rotatable at the same speed as a rotational speed of the input shaft 7A (hereinafter referred to as "input rotation"), and also connected to a fourth clutch C-4. Further, the first ring gear R1 rotates at a speed reduced compared to the speed of the input rotation by the first sun gear S1 which is stationary and the first carrier CR1 which performs the input rotation, and is connected to a first clutch C-1 and a third clutch C-3.

The third sun gear S3 of the planetary gear unit PU is connected to a first brake B-1 so as to be selectively stationary with respect to the case 6, and also connected to the fourth clutch C-4 and the third clutch C-3 so as to selectively receive the input rotation of the first carrier CR1 via the fourth clutch C-4 and the reduced-speed rotation of the first ring gear R1 via the third clutch C-3. In addition, the second sun gear S2 is connected to the first clutch C-1 so as to selectively receive the reduced-speed rotation of the first ring gear R1.

Further, the second (Ravigneaux type) carrier CR2 is connected to a second clutch (friction engagement element) C-2, to which rotation of the input shaft 7A is input via the center shaft 7B, so as to selectively receive the input rotation via the second clutch C-2, and also connected to a first one-way clutch (engagement element) F-1 and a second brake (different friction engagement element) B-2 so as to be restricted from rotating in one direction with respect to the case 6 via the first one-way clutch F-1 and so as to be selectively stationary in terms of rotation (selectively engageable) via the second brake B-2. The second ring gear R2 is connected to a counter gear 8.

A counter driven gear 11 that is fixed on the counter shaft 12 of the counter shaft portion 4 is meshed with the counter gear 8. A gear 14 of the differential portion 5 is meshed with the counter shaft 12 via an output gear 12a formed on the outer peripheral surface of the counter shaft 12. The gear 14 is fixed to a differential gear 13, and connected to the left and right drive shafts 15, 15 via the differential gear 13.

In the automatic transmission 1 configured as described above, the first to fourth clutches C-1 to C-4, the first and second brakes B-1 and B-2, and the first one-way clutch F-1 illustrated in the skeleton diagram of FIG. 1 are engaged and disengaged in combinations indicated in the engagement table of FIG. 2 to establish one of a first forward speed (1st) to an eighth forward speed (8th) and a first reverse speed (Rev1) to a second reverse speed (Rev2).

Subsequently, a detailed configuration of the rear portion of the automatic transmission 1 (speed change mechanism 3) will be described with reference to FIG. 3. The speed change mechanism 3 includes, at its center portion, the center shaft 7B which is spline-engaged with the input shaft 7A. The front side of the center shaft 7B is rotatably supported by the case 6 via the input shaft 7A. The rear side of the center shaft 7B is rotatably supported by a boss portion 6a formed on the case 6 via a needle bearing b1. A support member 89 that supports the first ring gear R1 via a bush b5 is rotatably supported on the outer peripheral side of the rear distal end portion of the input shaft 7A.

The Ravigneaux type planetary gear unit PU discussed above is disposed around the center shaft 7B on the outer peripheral side of the center shaft 7B and on the opposite side, in the axial direction, of a center support member 19 with respect to the counter gear 8. Particularly, the second sun gear S2 which is formed in a sleeve shape is disposed immediately on the outer peripheral side of the center shaft 7B so as to be relatively rotatable with respect to the center shaft 7B via a bush b2 and a bush b3. In addition, a flange portion 7Ba that extends in a flange shape is formed on the outer peripheral side of the center shaft 7B. The second sun gear S2 is restricted in position in the axial direction with respect to the flange portion 7Ba of the center shaft 7B via a thrust bearing b11, and also restricted in position in the axial direction with respect to the third sun gear S3 to be discussed later via a thrust bearing b12. The front side of the second sun gear S2 is spline-engaged with a coupling member 88 coupled to the third clutch C-3 and the fourth clutch C-4 discussed above.

The third sun gear S3 which is formed in a sleeve shape is disposed on the outer peripheral side of the second sun gear S2 so as to be relatively rotatable with respect to the center shaft 7B via a bush b4. In addition, the third sun gear S3 is restricted in position in the axial direction with respect to the second sun gear S2 via the thrust bearing b12, and also restricted in position in the axial direction with respect to the coupling member 88 via a thrust bearing b13. The coupling member 88 is restricted in position in the axial direction with respect to the support member 89 via a thrust bearing b14. The support member 89 is restricted in position in the axial direction with respect to the double-pinion planetary gear DP and the input shaft 7A. Thus, the second sun gear S2, the third sun gear S3, the coupling member 88, and the support member 89 are supported to be positioned in the axial direction with respect to the input shaft 7A and the center shaft 7B by the thrust bearings b11, b12, b13, and b14.

The second carrier (Ravigneaux type carrier) CR2 is disposed on the outer peripheral side of the second sun gear S2 and the third sun gear S3. The second carrier CR2 includes a frame body (structure) roughly composed of a first side plate (carrier cover) 51 and a second side plate (carrier body) 52 to rotatably support the plurality of long pinion gears P3 and the plurality of short pinion gears P4. The first side plate 51 has a generally circular plate shape, and is formed with through holes to which the rear end portions of pinion shafts 53 that rotatably support the long pinion gears P3 and the rear end portions of pinion shafts 54 that rotatably support the short pinion gears P4 are fitted and fixed. An oil receiver 55 that collects lubricating oil scattered from the inner peripheral side to lead the lubricating oil to oil passages in the pinion shafts 53 and the pinion shafts 54 is secured to the rear side of the first side plate 51.

Meanwhile, the second side plate 52 is formed such that portions thereof corresponding to the front end portions of the pinion shafts 53 of the long pinion gears P3 are formed in a thin-walled circular plate shape (flange portion 52f), portions thereof corresponding to the front end portions of the pinion shafts 54 of the short pinion gears P4 are formed as thick-walled portions 52a that are thicker than the thin-walled circular plate shape, and bridge portions (bridges) 52b are formed to be extended from the thick-walled portions 52a to the outer edge portion of the first side plate 51. As discussed in detail later with reference to FIGS. 4 and 5, the thick-walled portions 52a and the bridge portions 52b are disposed at portions at which the long pinion gears P3 are not present to be alternated with the plurality of long pinion gears P3 in the circumferential direction. In other words, the plurality of bridge portions 52b are not connected in the circumferential direction, and are void (open) at portions corresponding to the plurality of long pinion gears P3. Splines 52s to be spline-fitted with inner friction plates 21b of the second clutch C-2 are formed on the outer peripheral side of the bridge portions 52b. At portions corresponding to the outer peripheral side of the plurality of long pinion gears P3, there are no bridge portions, and therefore the inner friction plates 21b are not supported.

With the inner friction plates 21b of the second clutch C-2 directly spline-engaged with the splines 52s of the bridge portions 52b of the second carrier CR2 in this way, friction plates 21 of the second clutch C-2 can be made compact in the radial direction because of the absence of a hub member compared to a case where a cylindrical hub member that extends from a side plate is disposed on the outer peripheral side of bridge portions of a carrier as in the automatic transmission according to JP 2008-121808 A, for example.

Figure 4A:
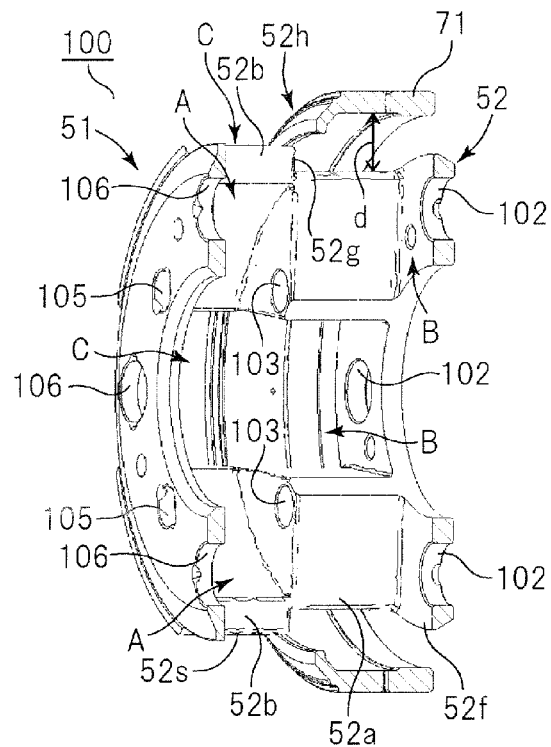
FIG. 4A is a perspective view as seen obliquely from the rear and FIG. 4B is a perspective view as seen obliquely from the front.
Figure 4B:
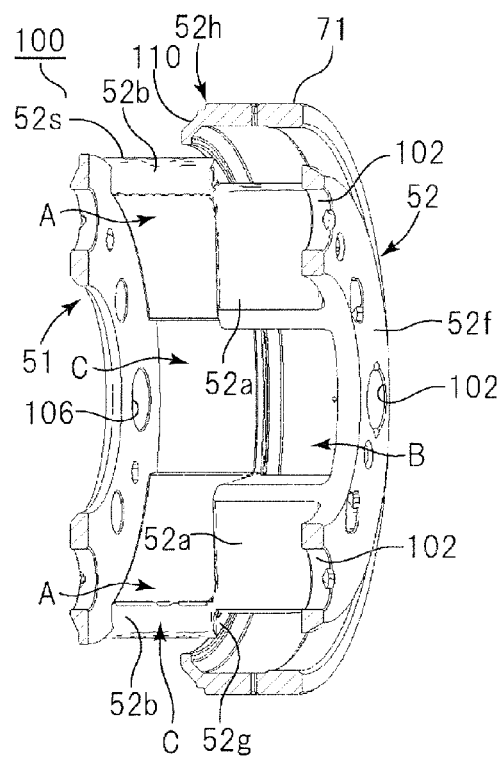
Figure 5A:
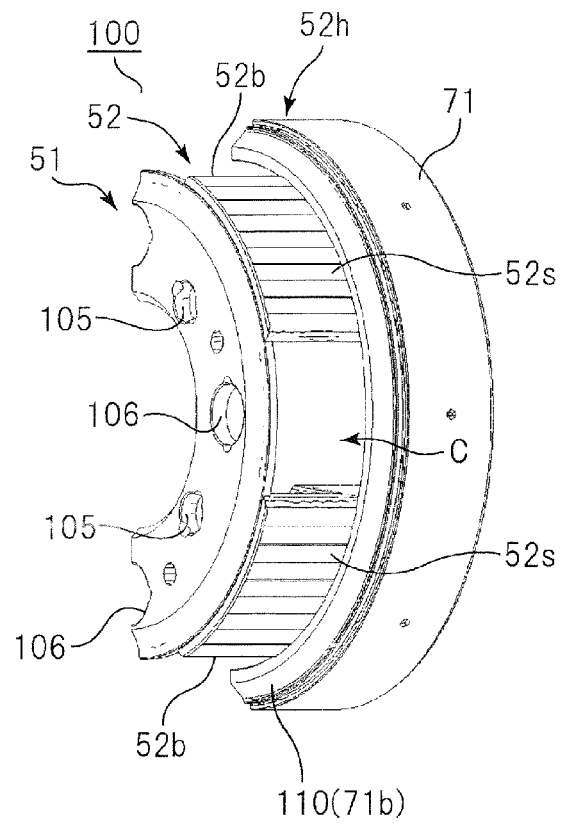
FIG. 5A is a perspective view as seen obliquely from the rear and FIG. 5B is a perspective view as seen obliquely from the front.
Figure 5B:
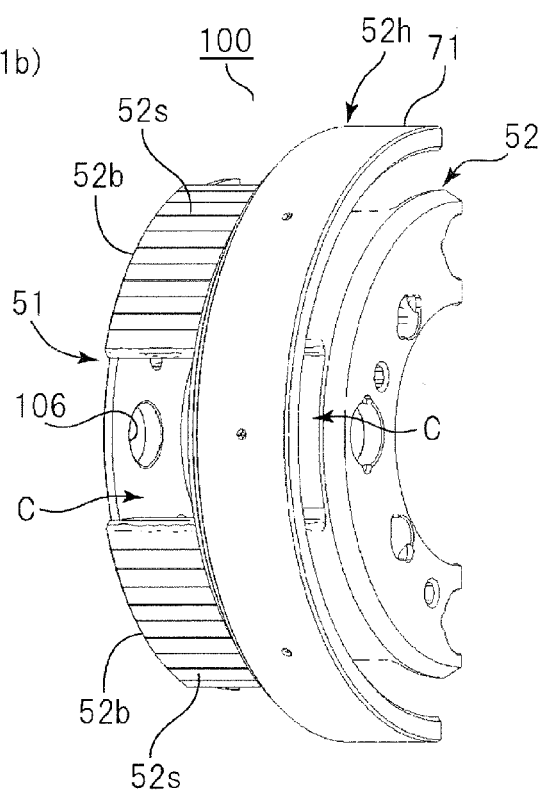

In addition, as described in detail with reference to FIGS. 4 and 5, a drum-shaped inner race 71 of the first one-way clutch F-1 is secured, e.g. welded, to the outer peripheral side of the front end portions of the bridge portions 52b, which are void at portions corresponding to the plurality of long pinion gears P3. The inner race 71 has a cylindrical inner race body 71a and an annular connection portion 71b. The annular connection portion 71b couples the plurality of bridge portions 52b distributed in the circumferential direction to each other, which increases the rigidity of the second carrier CR2 as a frame body. A hub member 38 of the second brake B-2 is secured, e.g. welded, to the outer peripheral side of the annular connection portion 71b. The second ring gear R2 of the planetary gear unit PU is disposed on the inner peripheral side of the inner race 71 so as to be meshed with the long pinion gears P3 to be supported.

Meanwhile, the second clutch C-2 is disposed to lie from the rear side of the planetary gear unit PU to the outer peripheral side of the rear portion thereof. The second clutch C-2 has the friction plates 21 composed of a plurality of outer friction plates (first outer friction plates) 21a and a plurality of inner friction plates (first inner friction plates) 21b, which are disposed in overlapping ranges in the axial direction as viewed in the radial direction of the planetary gear unit PU, and a hydraulic servo (first hydraulic servo) 20 that presses and drives the friction plates 21 to selectively engage the friction plates 21. The phrase "in overlapping ranges in the axial direction as viewed in the radial direction of the planetary gear unit PU" as used herein refers to a range in the axial direction from the rear end surface of the side plate 51 of the second carrier CR2 to the front end surface of the side plate 52.

The hydraulic servo 20 has a clutch drum 22, a piston member 23, a return plate 24, and a return spring 25, which define a working oil chamber 26 and a cancellation oil chamber 27. The clutch drum 22 is integrally formed by welding, for example, an inner circumferential member 22A and an outer circumferential member 22B to each other. The inner circumferential member 22A has a flange portion 22Aa that extends from the radially inner side to the radially outer side, and a sleeve portion 22Ab provided on the inner peripheral side of the flange portion 22Aa to extend in a sleeve shape. The distal end of the sleeve portion 22Ab is secured, e.g. welded, to the flange portion 7Ba of the center shaft 7B. The inner peripheral side of the sleeve portion 22Ab is supported so as to be rotatable with respect to the boss portion 6a of the case 6 via an annular member 81.

The outer circumferential member 22B has an extended portion 22Ba that extends from the outer periphery of the flange portion 22Aa to the friction plates 21, and a drum portion 22Bb that extends in a drum shape in the axial direction from the distal end side of the extended portion 22Ba. A spline portion 22Bs to be spline-engaged with the outer friction plates 21a discussed above is formed on the inner peripheral surface of the drum portion 22Bb. A snap ring 29 is fitted with the distal end portion of the spline portion 22Bs to restrict forward movement of the friction plates 21.

A portion that is on the front side of the flange portion 22Aa of the inner circumferential member 22A and that faces the piston member 23 is formed as a cylinder that defines the working oil chamber 26. In addition, the piston member 23 is fitted on the outer peripheral side of the sleeve portion 22Ab of the inner circumferential member 22A so as to be slidable in the axial direction. Also, the return plate 24 is disposed on the outer peripheral side of the sleeve portion 22Ab of the inner circumferential member 22A so as to be positioned by a snap ring 28. A thrust bearing b10 is interposed between the rear side of the flange portion 22Aa of the inner circumferential member 22A and the case 6 so that the clutch drum 22, that is, the hydraulic servo 20, is restricted in position in the axial direction.

The piston member 23 is disposed opposite to the front side of the flange portion 22Aa of the clutch drum 22 discussed above so as to be movable in the axial direction. The working oil chamber 26 which is oil-tight is structured between the clutch drum 22 and the piston member 23. A pressing portion 23a is extended on the outer peripheral side of the piston member 23, and disposed to face the friction plates 21. In addition, splines are formed on the outer peripheral surface of the pressing portion 23a. The pressing portion 23a is spline-engaged with the spline portion 22Bs formed on the inner peripheral side of the drum portion 22Bb to be restricted so as to be relatively unrotatable.

As discussed above, the return plate 24 is restricted from moving forward by the snap ring 28 fitted with the sleeve portion 22Ab. The cancellation oil chamber 27, which is oil-tight and in which the return spring 25 is provided in a contracted state, is defined between the return plate 24 and the piston member 23 disposed in rear of the return plate 24. The return plate 24 is urged forward at all times, that is, made stationary with respect to the clutch drum 22, on the basis of the urging force of the return spring 25.

In the second clutch C-2 configured as described above, when a working hydraulic pressure is supplied from oil passages c1 and c2 in the case 6 to the working oil chamber 26 via an oil passage c3 in the annular member 81, the piston member 23 is pressed and driven forward against the urging force of the return spring 25, which engages the friction plates 21 to drivably couple the input shaft 7A and the second carrier CR2 to each other in the rotational direction via the clutch drum 22 and the center shaft 7B. When a working hydraulic pressure is discharged from the working oil chamber 26, conversely, the piston member 23 is moved rearward by the urging force of the return spring 25 while a centrifugal hydraulic pressure in the working oil chamber 26 is canceled by oil in the cancellation oil chamber 27 to disengage the friction plates 21.

Meanwhile, the second brake B-2 is disposed on the outer peripheral side of the second clutch C-2 so as to cover the second clutch C-2. The second brake B-2 includes friction plates 31 composed of a plurality of outer friction plates (second outer friction plates) 31a and a plurality of inner friction plates (second inner friction plates) 31b, and a hydraulic servo (second hydraulic servo) 30 that engages the friction plates 31. The friction plates 31 are provided on the outer peripheral side of the friction plates 21 of the second clutch C-2 discussed above so as to at least partially overlap the friction plates 21 in the axial direction as viewed in the radial direction, and also provided on the outer peripheral side of the planetary gear unit PU to be disposed at a position in a range in which the friction plates 31 overlap the planetary gear unit PU in the axial direction as viewed in the radial direction.

The inner friction plates 31b are spline-engaged with the hub member 38 discussed above, and drivably coupled to the second carrier CR2 via the inner race 71. Meanwhile, the outer friction plates 31a are spline-engaged with the spline portion 6s formed on the inner peripheral surface of the case 6.

The hydraulic servo 30 has a cylinder portion 32 formed on the inner surface of the case 6, a piston member (piston) 33, an end plate 34, a return spring (spring) 35, and a retainer plate 37. The cylinder portion 32 and the piston member 33 define a working oil chamber 36. The piston member 33 is extended such that a distal end portion 33a on the front side of the piston member 33 is disposed to face the friction plates 31 via the retainer plate 37.

The end plate 34 also serves as a plate at the foremost end of the friction plates 31, is restricted from moving forward with respect to the case 6 by a snap ring 39, and has hook portions to be inserted into a plurality of grooves of the spline portion 6s. A ring-shaped projecting portion 34a that positions the front end portion of the return spring 35 is formed in rear of the hook portions. That is, the end plate 34 also serves as a retainer for the return spring 35. Thus, the return spring 35 is provided between the end plate 34 and the retainer plate 37 to be discussed later, and disposed at a position on the outer peripheral side of the friction plates 31 so as to overlap the friction plates 31 in the axial direction as viewed in the radial direction.

The retainer plate 37 has a body portion 37b in a ring plate shape, and has hook portions provided on the outer peripheral side of the body portion 37b to be inserted into the plurality of grooves of the spline portion 6s as with the end plate 34. A ring-shaped projecting portion 37a that positions the rear end portion of the return spring 35 is formed in front of the hook portions. In addition, the retainer plate 37 has a cylindrical fitted portion 37c provided on the inner peripheral side of the body portion 37b and formed to be bent rearward. The fitted portion 37c is spigot-fitted with the inner peripheral surface of the distal end portion 33a of the piston member 33. That is, the retainer plate 37 is positioned and supported in the radial direction by the piston member 33.

The body portion 37b of the retainer plate 37 has a wider area in the radial direction than the distal end portion 33a of the piston member 33, and is configured to disperse a force for pressing the friction plates 31 applied by the piston member 33 so that the friction plates 31 can be pressed uniformly in the axial direction, which improves the controllability of the second brake B-2. In addition, hook portions (not illustrated) that extend from the distal end portion 33a of the piston member 33 to at least one of the plurality of grooves of the spline portion 6s are provided. With the hook portions engaged in the grooves of the spline portion 6s, rotation of the piston member 33 is prevented, which prevents application of a force in the rotational direction to the retainer plate 37 and the return spring 35 to prevent torsion of the return spring 35.

In the second brake B-2 configured as described above, when a working hydraulic pressure is supplied from an oil passage in the case 6 (not illustrated) to the working oil chamber 36, the piston member 33 is pressed and driven forward against the urging force of the return spring 35, which engages the friction plates 31 with the case 6 to make the second carrier CR2 stationary in the rotational direction via the hub member 38 and the inner race 71. When a working hydraulic pressure is discharged from the working oil chamber 36, conversely, the piston member 33 is moved rearward by the urging force of the return spring 35 to disengage the friction plates 31.

Meanwhile, the first one-way clutch F-1 is disposed in front of the friction plates 21 of the second clutch C-2 and the friction plates 31 of the second brake B-2, on the outer peripheral side of the planetary gear unit PU, and at a position in a range in which the first one-way clutch F-1 overlaps the planetary gear unit PU in the axial direction as viewed in the radial direction.

The first one-way clutch F-1 roughly has the inner race 71 discussed above, an outer race 72, and a one-way restriction mechanism (such as a roller cam mechanism or a sprag mechanism, for example) 73 interposed between the inner race 71 and the outer race 72 to restrict the rotational direction of the inner race 71 to one direction.

The outer peripheral surface of the outer race 72 is spline-engaged with the spline portion 6s of the case 6. Both side surfaces of the outer race 72 are restricted by the snap rings 39 and 79 so that the outer race 72 is positioned to be stationary with respect to the case 6. Meanwhile, as discussed in detail later with reference to FIGS. 4 and 5, the inner race 71 has the cylindrical inner race body 71a and the annular connection portion 71b which extends toward the inner peripheral side from the rear end side of the inner race body 71a. The hub member 38, which is spline-engaged with the inner friction plates 31b of the second brake B-2, is secured, e.g. welded, to the outer peripheral side of the connection portion 71b. An end portion of the connection portion 71b on the inner peripheral side is secured, e.g. welded, to each of the plurality of bridge portions 52b of the side plate 52 of the second carrier CR2 discussed above. The annular connection portion 71b, in particular, of the inner race 71 enhances the rigidity of the second carrier CR2 as a frame body.

The second ring gear R2, which is meshed with the long pinion gears P3, is disposed on the inner peripheral side of the inner race 71 so as to be housed in the inner race 71. The front portion of the second ring gear R2 has a comb teeth portion R2a in a comb teeth shape. A dog portion 41a of the connection member 41 is engaged with the comb teeth portion R2a so as to be meshed with the comb teeth portion R2a from the inner peripheral side. A snap ring 43 is assembled between the comb teeth portion R2a and the dog portion 41a. The second ring gear R2 and the connection member 41 are integrally connected to each other.

In addition, a spline portion 41s is formed on the inner peripheral portion of the connection member 41, and spline-engaged with a spline portion 8s formed on the counter gear 8. The connection member 41 and the counter gear 8 are integrally connected to each other by a snap ring 42.

A tooth surface 8a is formed on the outer peripheral side of the counter gear 8, and meshed with a tooth surface 11a of the counter driven gear 11. An angular ball bearing b20 is fitted with the inner peripheral surface of the counter gear 8. The counter gear 8 is rotatably supported by a sleeve portion 19b of the center support member 19 via the angular ball bearing b20. The angular ball bearing b20 is provided on the outer peripheral surface of the sleeve portion 19b of the center support member 19, and fastened between a flange-shaped portion 19a and a nut 18. A plurality of projecting portions are formed on the outer peripheral side of the flange-shaped portion 19a of the center support member 19. The plurality of projecting portions are fastened to the case 6 by a plurality of bolts 91 so that the center support member 19 is fixed to the case 6. A thickened portion 19c for forming oil passages c61 and c62 for the first brake B-1 to be discussed later is formed in rear of the flange-shaped portion 19a.

The first brake B-1 is disposed in front of the outer peripheral side of the center support member 19. The first brake B-1 includes friction plates 61 composed of a plurality of outer friction plates 61a and a plurality of inner friction plates 61b, and a hydraulic servo 60 that engages and disengages the friction plates 61. The inner friction plates 61b are spline-engaged with a hub member 68 connected to the third sun gear S3 discussed above.

In multi-plate brakes, in general, outer friction plates are spline-engaged with splines formed on the inner peripheral surface of the case 6 to serve to prevent rotation. In the automatic transmission 1, however, the counter shaft portion 4 is brought closer to the speed change mechanism 3 to make the automatic transmission 1 compact. Therefore, the case 6 is cut away between the counter shaft portion 4 and the speed change mechanism 3. Therefore, the first brake B-1 is provided with a brake drum 64 fixed to the center support member 19 which supports the counter gear 8, and the outer friction plates 61a are spline-engaged with the brake drum 64.

The hydraulic servo 60 has a cylinder portion 62 formed on the brake drum 64, a piston member 63, a return spring 65, and a retainer plate 67. The cylinder portion 62 and the piston member 63 define a working oil chamber 66. The piston member 63 is extended such that the distal end portion thereof is disposed to face the friction plates 61.

The return spring 65 is provided in a contracted state between the piston member 63 and the retainer plate 67. In addition, the inner peripheral side of the retainer plate 67 is formed in a comb teeth shape, caused to abut against the inner peripheral side of the brake drum 64 also formed in a comb teeth shape, and restricted in position by a snap ring 69 with respect to a comb teeth portion 19d of the center support member 19 formed in a comb teeth shape, that is, made stationary with respect to the case 6 via the center support member 19.

In the first brake B-1 configured as described above, when a working hydraulic pressure is supplied from an oil passage c60 formed in the case 6 to the working oil chamber 66 via the oil passages c61 and c62 formed in the thickened portion 19c of the center support member 19, the friction plates 61 are pressed by the piston member 63 to engage the first brake B-1, which makes the hub member 68 and the third sun gear S3 stationary with respect to the case 6. When a working hydraulic pressure is discharged from the working oil chamber 66, conversely, the return spring 65 urges the piston member 63 rearward via the snap ring 69 and the retainer plate 67 to disengage the first brake B-1.

The counter driven gear 11 discussed above is integrally stationary with respect to the counter shaft 12 by being spline-engaged with the counter shaft 12, which is rotatably supported by the case 6 through a tapered roller bearing b21, and being fastened by the tapered roller bearing b21. The counter driven gear 11 has the tooth surface 11a meshed with the counter gear 8 as discussed above, and a parking gear 11b integrally formed in rear of the tooth surface 11a, that is, on the planetary gear unit PU side in the axial direction. The parking gear 11b is meshed with a parking pole driven by a parking mechanism (not illustrated) to prohibit rotation of wheels (not illustrated) via the counter shaft 12, the differential portion 5, and the drive shafts 15, 15 in a parking range.

Next, lubrication oil passages in the automatic transmission 1 will be described. Lubricating oil is supplied from a hydraulic control device (not illustrated) to an oil passage (space) c11 provided on the rear end side of the center shaft 7B through an oil passage in the case 6. A part of the lubricating oil supplied to the oil passage c11 lubricates the needle bearing b1, and most of the other lubricating oil is introduced into an oil passage c12 formed in the center shaft 7B to extend in the axial direction. Then, the lubricating oil introduced into the oil passage c12 is scattered around the center shaft 7B from oil passages c13, c14, c15, c16, c17, c18, and c19 formed to penetrate from the oil passage c12 to the outer peripheral surface of the center shaft 7B.

The lubricating oil scattered from the oil passage c13 is introduced into the cancellation oil chamber 27 via an oil passage c20 formed in the clutch drum 22. The lubricating oil scattered from the oil passage c14 lubricates the thrust bearing b11, and is led to the inner peripheral side of the side plate 51 of the second carrier CR2. A part of the lubricating oil is collected by the oil receiver 55. A part of the collected lubricating oil lubricates between the short pinion gears P4 and the pinion shafts 54 via oil passages c31 and c32 formed in the pinion shafts 54 of the short pinion gears P4, and thereafter is scattered to the outer peripheral side on the basis of a centrifugal force. Meanwhile, another part of the lubricating oil collected by the oil receiver 55 lubricates between the long pinion gears P3 and the pinion shafts 53 via oil passages c33 and c34 formed in the pinion shafts 53 of the long pinion gears P3, and thereafter is scattered to the outer peripheral side on the basis of a centrifugal force.

The lubricating oil led to the outer periphery of the center shaft 7B through the oil passage c15 lubricates the bush b2, and thereafter is led to the thrust bearing b11 and an oil passage c41 formed in the second sun gear S2. In addition, a part of the lubricating oil led through the oil passage c16 is also led to the oil passage c41 formed in the second sun gear S2. A part of the lubricating oil led to the oil passage c41 is merged with a part of the lubricating oil scattered from the oil passage c14 to the side plate 51 while lubricating between the tooth surface of the second sun gear S2 and the tooth surface of the short pinion gears P4, led to the voids between the long pinion gears P3 and the bridge portions 52b, and led to the friction plates 21 of the second clutch C-2. That is, the friction plates 21 of the second clutch C-2 of the automatic transmission 1 do not have a hub member on the inner peripheral side, and thus the lubricating oil flows between the long pinion gears P3 and the bridge portions 52b without being hindered to provide good lubrication.

A part of the lubricating oil which has passed through the oil passage c16, the lubricating oil which has passed through the oil passage c17, and a part of the lubricating oil which has passed through the oil passage c18 to lubricate the bush b3 are led to the outer peripheral side of the second sun gear S2 via oil passages c42, c43, and c44 formed in the second sun gear S2, and a part of the lubricating oil is led to the inner peripheral side of the second carrier CR2 through the thrust bearing b12 while lubricating the bush b4. The lubricating oil led to the inner peripheral side of the second carrier CR2 lubricates the tooth surface of the second ring gear R2 while lubricating between the tooth surface of the third sun gear S3 and the tooth surface of the long pinion gears P3, and thereafter passes through an oil passage c54 of the inner race 71 to lubricate the one-way restriction mechanism 73.

In addition, the lubricating oil which has passed through the oil passages c43 and c44 passes through an oil passage c51 formed in the third sun gear S3 and the thrust bearing b13, further passes through an oil passage c52 formed in the hub member 68, and passes through an oil passage c53 formed in the center support member 19 to lubricate the angular ball bearing b20 and the counter gear 8. The remaining lubricating oil which has passed through the oil passage c18 to lubricate the bush b3 and the lubricating oil which has passed through the oil passage c19 lubricates the thrust bearing b14, and passes through the inner surface of the coupling member 88 to be led to the first clutch C-1 (not illustrated).

In the embodiment described above, the automatic transmission 1 establishes one of eight forward speeds and two reverse speeds, for example. However, the present embodiment is not limited thereto, and the automatic transmission 1 may establish one of six forward speeds and a reverse speed, for example. In addition, the automatic transmission 1 is connected to only the engine. However, the automatic transmission 1 may be an automatic transmission for hybrid vehicles including a motor generator in place of the torque converter 2, for example.

Figure 6:
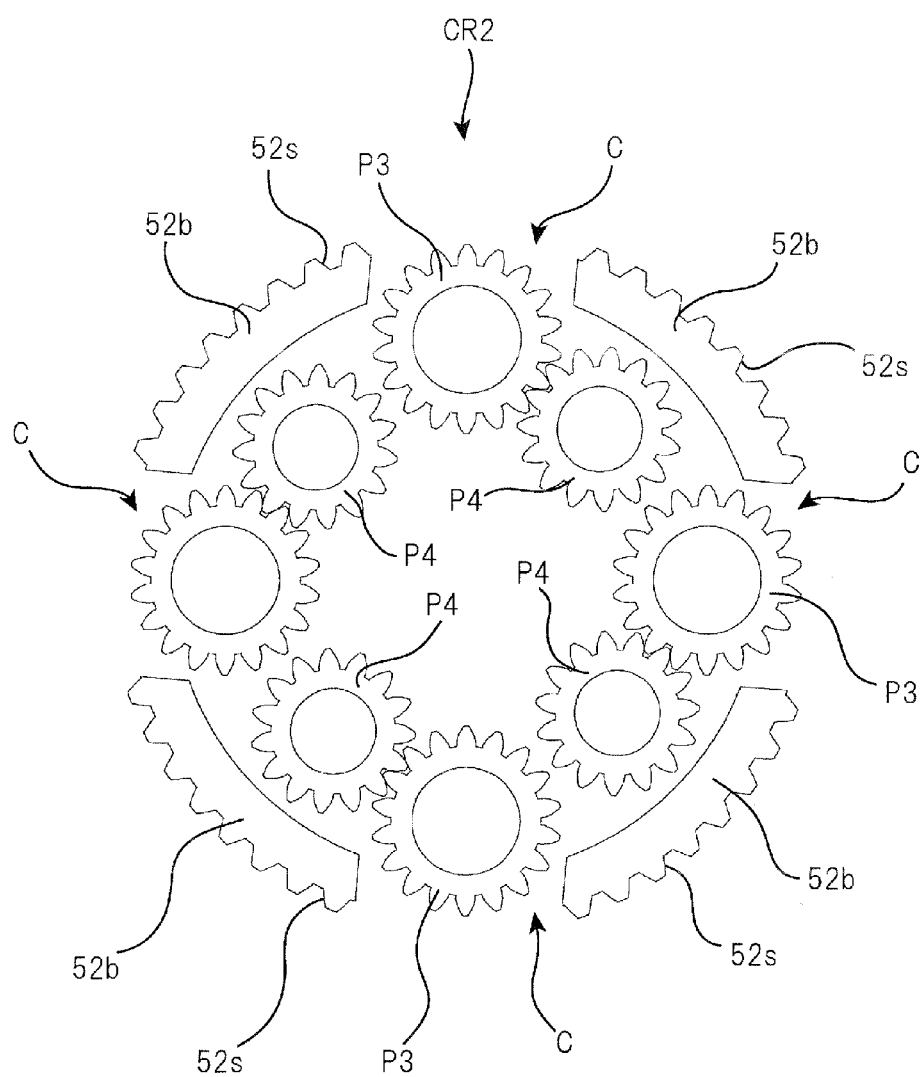
FIG. 6 is a cross-sectional view of the carrier according to the embodiment taken along the A-A line of FIG. 3.

Next, the Ravigneaux type (second) carrier CR2, which is an essential portion of the present embodiment, will be described with reference to FIGS. 4, 5, and 6. FIGS. 4 and 5 are perspective views of the frame body (structure) of the carrier CR2 from which mounted members such as the short pinion gears, the long pinion gears, and the shafts of such gears have been removed and which is cut at the middle and seen from various directions. A carrier structure 100 is composed of the second side plate (carrier body) 52 formed by casting, the first side plate (carrier cover) 51 integrally attached to the rear end surface of the carrier body, and the inner race (annular member 52h) 71 integrally fixed, e.g. welded, to the radially outer side of the carrier body 52.

The carrier body 52 has the annular flange portion 52f provided on the front end side. The thick-walled portions 52a are formed to project rearward from portions of the flange portion 52f corresponding to the short pinion gears. That is, short pinion gear (P4) housing spaces A are defined between the four thick-walled portions 52a and the carrier cover 51, and long pinion gear (P3) housing spaces B are defined between portions of the flange portion 52f between the thick-walled portions 52a in the circumferential direction (at which the thick-walled portions are not provided) and the carrier cover 51. The bridge portions 52b which extend toward the rear end via a small step 52g that extends radially outward are formed in rear of the thick-walled portions 52a. Thus, the outer periphery of the short pinion gear housing spaces A is blocked by the bridge portions 52b, and openings C that are open on the radially outer side are provided at portions between the bridge portions in the circumferential direction. The openings correspond to the long pinion gear housing spaces B. That is, the openings C which are continuous in the axial direction are provided on the radially outer side of the long pinion gear housing spaces B between the flange portion 52f and the carrier cover 51, both of which have a ring shape, and the thick-walled portions 52a and the bridge portions 52b are formed to be continuous in the axial direction between the openings C.

Holes 102 for the long pinion gear shafts (53) are formed in portions of the flange portion 52f facing the long pinion gear housing spaces B. Holes 103 for the short pinion gear shafts (54) are formed in portions of the thick-walled portions 52a facing the short pinion gear housing spaces A.

Meanwhile, the carrier cover 51 is composed of a ring-shaped and relatively thin-walled plate-like member, and integrally fixed to the distal ends of the bridge portions of the carrier body 52. Holes 105 for the short pinion gear shafts are formed in the carrier cover 51 at positions corresponding to the short pinion gear housing spaces A. Holes 106 for the long pinion gear shafts are formed in the carrier cover 51 at positions corresponding to the long pinion gear housing spaces B. The carrier body 52 is integrally formed with the flange portion 52f, the thick-walled portions 52a, and the bridge portions 52b. The distal ends of the bridge portions 52b are integrally fixed to the carrier cover 51. Thus, the carrier CR2 has high torsional rigidity compared to the carrier described in Patent Document 1.

The splines 52s are formed on the outer peripheral surface of the bridge portions 52b of the carrier body 52. The inner friction plates (21b) of the second clutch (friction engagement element) (C-2) are engaged with the splines 52s. The long pinion gears P3 engaged with the ring gear R2 are disposed on the radially outer side of the carrier structure 100 with respect to the short pinion gears P4 meshed with the sun gear S2 as is clear from the positions of the holes 102, 106 and 103, 105 for such shafts. The openings C are provided on the radially outer side of the long pinion gear housing spaces B, and do not interfere with the inner friction plates 21b. The bridge portions 52b positioned on the radially outer side of the short pinion gear housing spaces A can be disposed on the radially inner side with respect to those according to the related art (see JP 2008-121808 A). With a combination of the improvement in torsional rigidity of the carrier CR2 and the arrangement of the bridge portions 52b, the second clutch C-2 having the inner friction plates 21b engaged with the splines 52s can also be disposed on the radially inner side with respect to those according to the related art.

The annular member 52h in a ring shape that extends over the entire circumference is integrally fixed, e.g. welded, to the front end side of the bridge portions 52b. Thus, the annular member 52h is fixed to the bridge portions 52b and the thick-walled portions 52a, which extend in a comb teeth shape with the openings C provided therebetween, over the entire circumference at the middle portion in the axial direction, which enhances the rigidity of the carrier structure 100. The annular member 52h is a cylindrical portion that extends forward in a drum shape in parallel with the outer peripheral surfaces of the thick-walled portions 52a through a stepped portion (corresponding to the connection portion 71b) 110 inclined forward and with a predetermined radial gap d from the outer peripheral surfaces of the thick-walled portions 52a. The cylindrical portion constitutes the inner race 71 of the first one-way clutch F-1. The second ring gear R2 is disposed in a space of the predetermined radial gap d between the cylindrical portion of the annular member 52h which constitutes the inner race 71 and the thick-walled portions 52a, and meshed with the long pinion gears P3.

Figure 3:
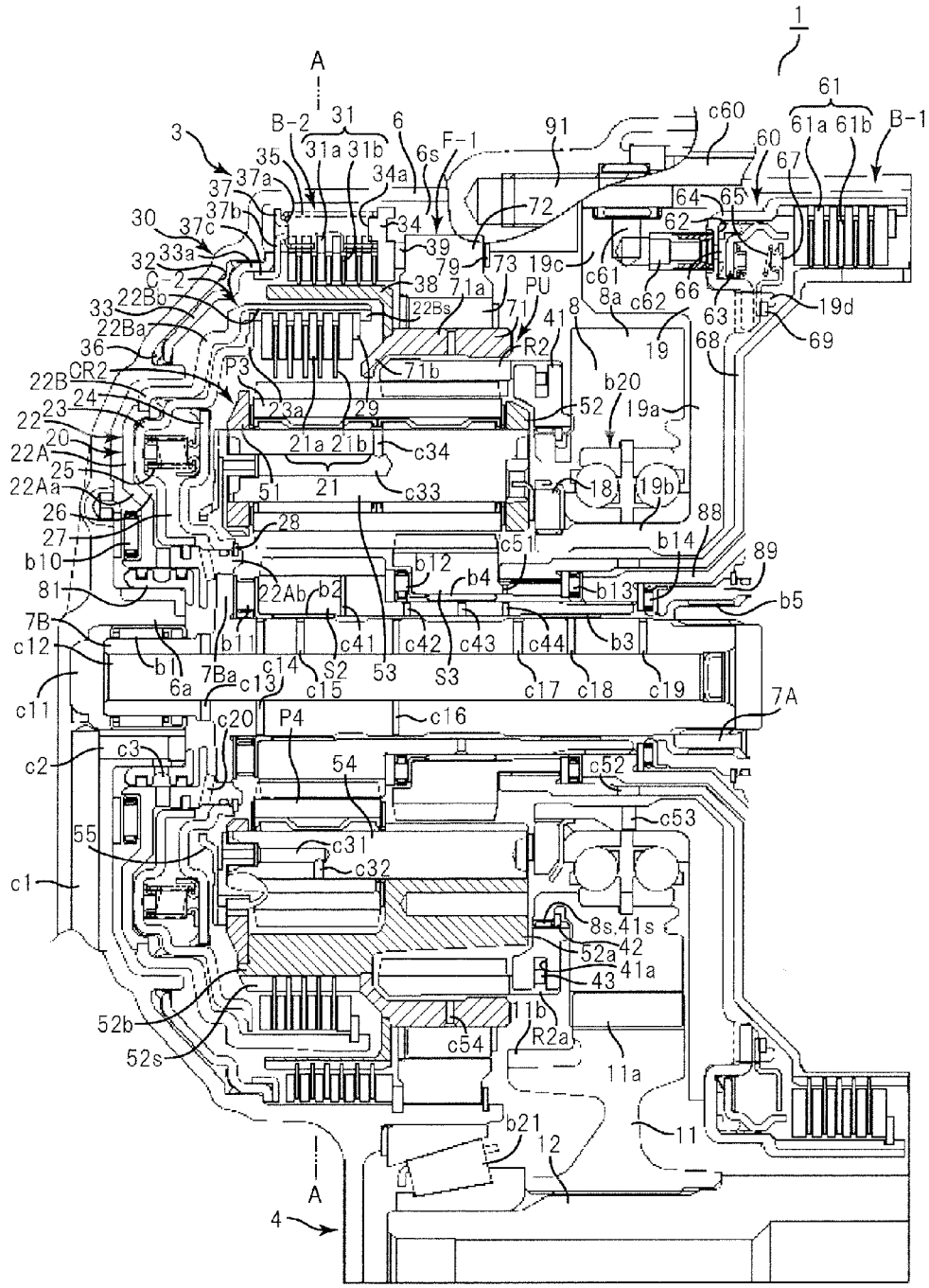
FIG. 3 is a sectional view illustrating a part of the automatic transmission according to the embodiment.

As illustrated in FIG. 3, the hub member 38 of the second brake (different friction engagement element) B-2 is integrally fixed, e.g. welded, to the outer peripheral side of the step of the annular member 52h. The hub member 38 extends rearward in the axial direction in parallel with the outer peripheral surfaces of the bridge portions 52b. The second clutch C-2 (the clutch drum 22 and the friction plates 21) is disposed between the hub member 38 and the bridge portions 52b. The inner friction plates 21b are engaged with the splines formed on the outer peripheral surfaces of the hub member 38. The inner friction plates 21b and the outer friction plates 31a engaged with the spline portion 6s of the case 6 constitute the second brake B-2.

The carrier (assembly) CR2 is assembled by mounting the long pinion gears P3 and the short pinion gears P4 by fixing the carrier cover (first side plate) 51 to the distal end portions of the bridge portions 52b of the carrier body (second side plate) 52 with the long pinion gears P3 and the short pinion gears P4 supported by the carrier body to which the annular member 52h and the hub member 38 are integrally fixed.

The second clutch C-2 and the second brake B-2 are disposed so as to at least partially (mostly) overlap each other (two-storied structure) in the axial direction as viewed in the radial direction. The first one-way clutch F-1 is disposed in front of the second clutch C-2 and the second brake B-2 in the axial direction so as to at least partly (mostly) overlap the second clutch C-2 and the second brake B-2 in the radial direction as seen in the axial direction. The ring gear R2 is disposed so as to at least partially (mostly) overlap the first one-way clutch F-1 in the axial direction as viewed in the radial direction. With a combination of such features, the automatic transmission having the Ravigneaux type planetary gear unit PU can be made compact in the axial direction.

In the carrier structure 100, as discussed earlier, the openings C are provided on the radially outer side of the short pinion gear housing spaces A, the bridge portions 52b provided between the openings C in the circumferential direction are disposed on the radially inner side, and the inner friction plates 21b of the clutch are engaged with the splines 52s on the outer peripheral surfaces of the bridge portions 52b to dispose the second clutch C-2. Thus, the clutch C-2 can be disposed on the radially inner side. In combination with the configuration of the second brake B-2 itself, the second brake B-2 disposed on the radially outer side of the clutch C-2 can be disposed on the radially inner side, which makes it possible to make the automatic transmission having the Ravigneaux type planetary gear unit PU compact in the radial direction. Further, lubricating oil supplied from the center shaft is supplied to the second clutch C-2 through the openings C, and further to the second brake B-2. In addition, the radial dimension of the second brake B-2 is limited in a predetermined range, which suppresses a reduction in transfer efficiency with drag torque becoming excessive.

With a combination of such features, the mountability of the automatic transmission on vehicles can be improved. The effect is ascribable to the configuration of the Ravigneaux type carrier CR2 discussed above, in particular the structure 100 thereof. The annular member 52h is basically a strong member. Instead of forming the inner race 71 on the annular member 52h, a hub member of a different clutch or brake (engagement element) may be formed on the annular member 52h, or no such members of friction engagement elements may be formed on the annular member 52h. The friction engagement element engaged with the splines 52s formed at the outer periphery of the bridge portions 52b is not limited to the second clutch C-2, and may be a different clutch or brake. The different friction engagement element engaged with the hub member 38 is not limited to the second brake B-2, and may be a different brake or clutch. Alternatively, the hub member 38 itself may not be provided.

INDUSTRIAL APPLICABILITY

The present embodiment is utilized for an automatic transmission to be mounted on an automobile, and utilized for a carrier of the automatic transmission.

DESCRIPTION OF THE REFERENCE NUMERALS

1 Automatic Transmission
21 Friction Member
38 Hub Member
51 Carrier Cover (First Side Plate)
52 Carrier Body (Second Side Plate)
52a Thick-Walled Portion
52b Bridge Portion
52f Flange Portion
52h Annular Member
52s Spline
71 Cylindrical Portion (Inner Race)
100 Structure (Carrier)
A Short Pinion Gear Housing Space
B Long Pinion Gear Housing Space
C Opening
CR2 Carrier
P3 Long Pinion Gear
P4 Short Pinion Gear
C-2 Friction Engagement Element (Second Clutch)
B-2 Different Friction Engagement Element (Second Brake)
F-1 Engagement Element (First One-Way Clutch)

The invention claimed is:

1. An automatic transmission including a carrier having short pinion gears and long pinion gears, and a friction engagement element disposed on an outer peripheral side of the carrier, comprising:
    a structure that supports the short pinion gears and the long pinion gears of the carrier includes a carrier body and a carrier cover;
    the carrier body includes an annular flange portion, thick-walled portions that are integral with the flange portion, and bridge portions that extend from the thick-walled portions, long pinion gear housing spaces are formed between the flange portion and the carrier cover, and short pinion gear housing spaces are formed between the thick-walled portions and the carrier cover;
    a radially outer side of the short pinion gear housing spaces is covered by the bridge portions which extend from the thick-walled portions and distal ends of which are integrally fixed to the carrier cover;
    a radially outer side of the long pinion gear housing spaces is made open by opening portions provided between the bridge portions in a circumferential direction; and
    splines to be fitted with a friction member of the friction engagement element are formed on outer peripheral surfaces of the bridge portions.

2. The automatic transmission according to claim 1, wherein
    a ring-shaped annular member that extends over an entire circumference is integrally fixed to outer peripheral portions of the bridge portions on a side of the thick-walled portions.

3. The automatic transmission according to claim 2, wherein:
    the annular member includes a cylindrical portion provided on a radially outer side of the thick-walled portions to extend in parallel with outer peripheral surfaces of the thick-walled portions; and
    engagement element that is different from the friction engagement element is mounted to the cylindrical portion.

4. The automatic transmission according to claim 3, wherein:
    the annular member includes a hub member provided on a radially outer side of the friction engagement element to extend in parallel with outer peripheral surfaces of the bridge portions;

the hub member is engaged with a friction member of a different friction engagement element that is different from the friction engagement element; and the friction engagement element and the different friction engagement element are disposed so as to at least partially overlap each other in an axial direction as viewed in a radial direction.

5. The automatic transmission according to claim 2, wherein:

the annular member includes a hub member provided on a radially outer side of the friction engagement element to extend in parallel with outer peripheral surfaces of the bridge portions;

the hub member is engaged with a friction member of a different friction engagement element that is different from the friction engagement element; and the friction engagement element and the different friction engagement element are disposed so as to at least partially overlap each other in an axial direction as viewed in a radial direction.

\* \* \* \* \*